Figure 3:
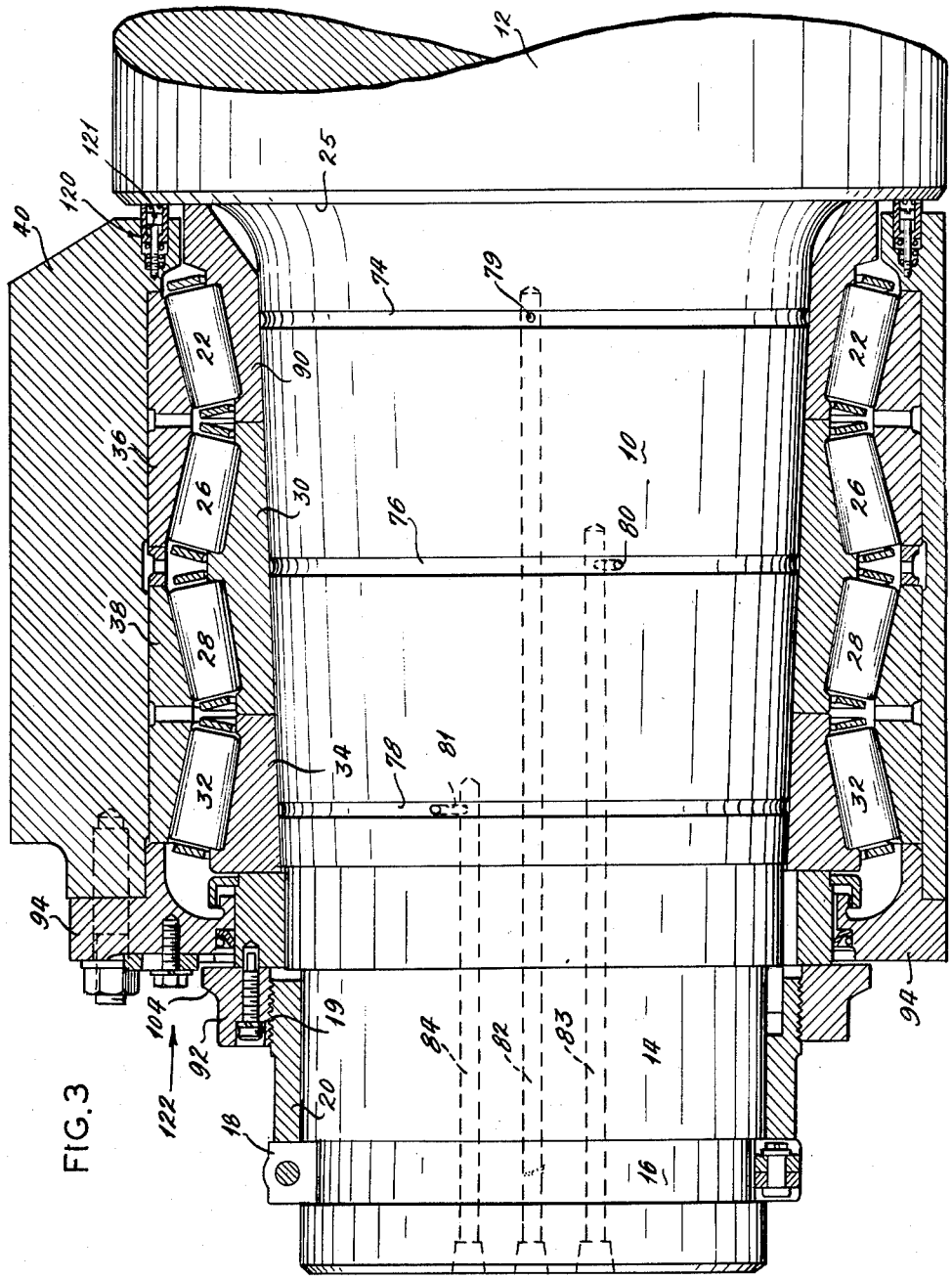

June 7, 1960
S. M. WECKSTEIN
2,939,750
BEARING MOUNTING FOR USE ON TAPERED
MILL ROLL NECKS AND THE LIKE
Filed Sept. 29, 1958
2 Sheets-Sheet 1
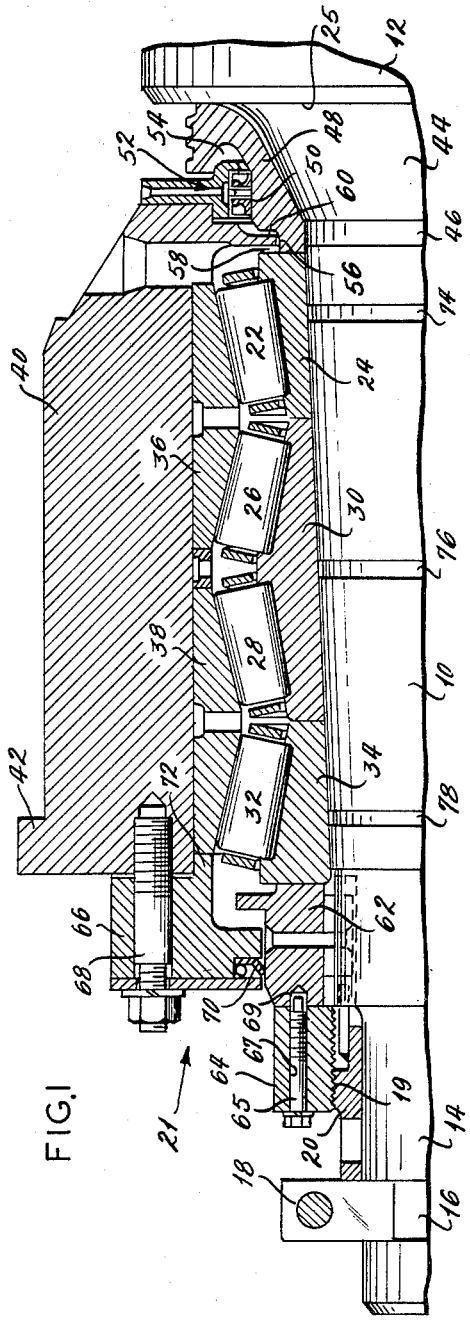
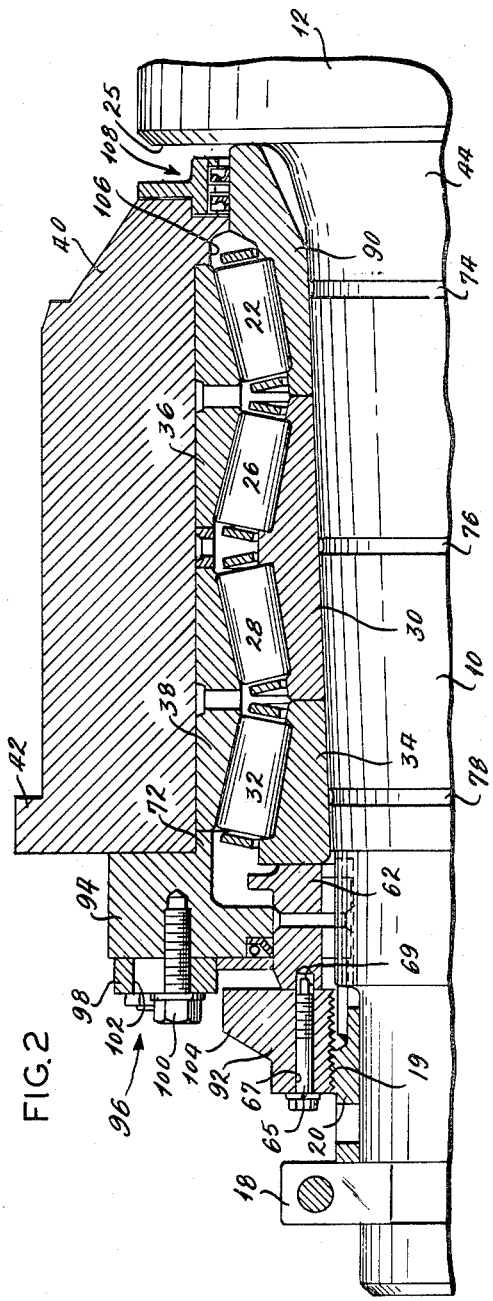
INVENTOR:
Samson M. Weckstein
By Gravely, Lieder & Woodruff
ATTORNEYS.

United States Patent Office 2,939,750
Patented June 7, 1960

2,939,750

BEARING MOUNTING FOR USE ON TAPERED MILL ROLL NECKS AND THE LIKE

Samson M. Weckstein, Canton, Ohio, assignor to The Timken Roller Bearing Company, Canton, Ohio, a corporation of Ohio Filed Sept. 29, 1958, Ser. No. 764,011

15 Claims. (Cl. 308—236)

The present invention relates generally to bearing mountings and more particularly to bearing mountings for use on tapered mill roll necks and the like.

Prior bearing mountings for tapered mill roll necks and the like have been devised, but heretofore, no provision has been made to simplify the design by eliminating the need for a separate backing ring and incorporating the backing ring as an integral part of an inner race member. This feature reduces the distance from the end face of the mill roll body to the center line of the bearing assembly and thereby reduces the stresses on the neck or journal member. This provision also makes it possible to use smaller diameter necks and if desired smaller diameter roll bodies. By the same token a larger initial roll body may be used and its diameter reduced as it wears to prolong its useful life.

It is an object of the present invention therefore to provide a bearing mounting for a tapered mill roll neck or the like that reduces to a minimum the necessary neck length so as to improve the stress conditions thereon.

Another object of the present invention is to provide an inexpensive bearing mounting for a tapered mill roll neck by reducing the number of bearing parts therein.

Another object of the present invention is to provide means in a bearing mounting for absorbing the damaging shock when the mounting is broken loose from its mounted position so that no damage will occur to the bearing parts.

Another object of the present invention is to provide a bearing mounting for a tapered mill roll neck or like member that can be quickly broken loose from a fitted position on the neck or like member by hydraulic pressure without damaging the bearing parts thereby.

Another object of the present invention is to provide a bearing mounting with motion restricting means to prevent damage to the bearing members when moving the members during dismounting thereof.

Another object of the present invention is to provide a bearing mounting for a tapered mill roll neck that is fitted to the neck so as to be suitable for heavy duty high-speed operation and yet which can be removed quickly and easily from the neck without damaging the bearing members.

Another object of the present invention is to provide a bearing mounting for a tapered mill roll neck or like journal member that can be removed therefrom in minimum time, with minimum labor, and without damaging the parts thereof.

Still another object of the present invention is to provide a seal for a bearing mounting on a mill roll neck that simplifies installing and removal of the bearing mounting therefrom.

Briefly, the present invention comprises a bearing mounting adapted to be interference fitted onto a tapered mill roll neck or shaft, which mounting includes pressure fluid means for quickly loosening the mounting on the neck and means for preventing damage to the bearing members during the loosening thereof. The invention further includes improved means for sealing the bearing mounting directly to the neck or to the body of the mill roll itself.

Other objects and advantages of the present invention will become apparent after consideration of the following specification and the accompanying drawings.

In the drawings:

Fig. 1 is a fragmentary elevational view in section, showing a bearing mounting constructed according to the teachings of the present invention and installed on a tapered mill roll neck, Fig. 2 is a fragmentary elevational view in section, showing a modification of the bearing mounting of Fig. 1 on a tapered mill roll neck, and Fig. 3 is an elevational view in section showing a modification of the bearing mounting of Fig. 2 installed on a tapered mill roll neck.

Referring to the drawings, and particularly to Figs. 1 and 3, 10 refers to a tapered mill roll neck which is shown formed integral with mill roll body 12. Extending endwardly from the tapered neck 10, and also formed integrally therewith, is a smaller diameter extension 14 which has an outside groove 16 therein. An annular thrust ring 18 is removably positioned in the groove 16 and extends outwardly therefrom to provide a backstop for another thrust ring or sleeve 20 that has an outside threaded portion 19.

The tapered neck 10 is adapted to receive the inner race portions of a bearing assembly 21. Fig. 1 shows the bearing assembly 21 having four rows of bearing rollers. The innermost row of bearing rollers, designated by number 22, has its associated inner race 24 mounted nearest to end face 25 on the mill roll body 12; the two middle rows of bearing rollers, designated 26 and 28, are disposed in races on a common inner race ring 30; and the outermost row of rollers 32 has an associated inner race 34. The races 24, 30 and 34 are installed on the tapered roll mill neck 10 and have an interference fit therewith.

The rows of bearing rollers 22, 26, 28 and 32 engage outer race members designated by the numbers 36 and 38. The member 36 has two race surfaces that engage the rows of rollers 22 and 26, and the member 38 has two race surfaces that engage the rows of rollers 28 and 32. The outer race members 36 and 38 are positioned in a bearing housing 40 which is installed in a window opening in a mill housing or stationary member (not shown). The bearing housing 40 is provided at its outer side with a limiting rim or flange 42 to prevent movement thereof completely through the mill housing.

The neck 10 has a steeply tapered portion 44 adjacent to the end face 25 of the mill roll body 12 which has the modified appearance of a fillet. The portion 44 is shown separated from the rest of the neck 10 by a short cylindrical neck section 46, and the section 46 and the portion 44 receive a backing ring 48 for the bearing assembly 21. The outer surface of the backing ring 48 is provided with a cylindrical surface 50 which makes sliding and sealing engagement with a suitable seal 52 carried on the housing 40. In Fig. 1, the backing ring 48, to the right of the seal 52, has an annular cavity 54 which receives a portion of the seal 52 and which helps to prevent dust and dirt from settling on the seal 52.

To the left of the seal 52 the backing ring 48 is turned down to form a second cylindrical surface 56, and the outer end face of the backing ring 48 forms an abutment surface for the inner race 24. When installed, the surface 56 is spaced inwardly from the adjacent portion of the outer surface of the race 24 and forms an annular groove 58 therewith. The annular groove 58 receives a flange 60 on the housing or chuck 40 and provides space in which said flange 60 can move axially. The flange 60 is of particular importance to the present invention as will be shown hereinafter.

On the outer side of the inner race 34 is positioned an annular spacer or pressure ring 62. To the left and engaged therewith is a threaded sleeve member 64 which is threaded upon and cooperates with the thrust ring 20. When installing the bearing assembly 21 on the neck 10, the member 64 is threaded on ring 20 and thereby moves the pressure ring 62 to the right into engagement with the inner race 34 which at this time is interference fitted onto the neck 10 as will be shown hereinafter. Interference fits are well known to the rolling art and are characterized by tight surface-to-surface contact between the members. Interference fits are highly desirable if not absolutely necessary for heavy-load high-speed rolling operations where a less tight fit would result in scuffing between the neck 10 and the inner races 34, 30 and 24 and more rapid wear of the parts. A locking screw 65 extends through threaded bore 67 in the member 64 and into bores 69 in the pressure ring 62 to prevent relative movement between the member elements when the assembly 21 is installed.

A clamping block 66 is connected by threaded members 68 to the left end of the housing 40. The clamping block 66 is provided with a suitable sealing member 70 that slidably coacts with the outer surface of the pressure ring 62 and also has an axial flange 72 that engages the outer end of the outer race 38 and holds the outer races 36 and 38 in fixed positions in the housing 40. The clamping blocks 66 associated with the bearing assemblies on opposite sides of the mill roll body 12 are adjusted to provide a limited amount of play for the outer races 36 and 38. Some play is usually desirable because changes in the temperature of the mill roll body 12 and the neck 10 may produce axial movement due to expansion and contraction which might otherwise cause binding.

The neck 10 is provided with three outside annular grooves designated 74, 76 and 78. Each of the grooves is connected with a radial and an axial passage (Fig. 3) in the neck 10. The radial passages are designated 79, 80 and 81 and the axial passages are designated 82, 83 and 84. The grooves 74, 76 and 78 are formed in the neck 10 so that when the bearing assembly is installed, each of the inner race members will cover a different one of the grooves and forms a chamber therewith. The chambers so formed each communicate with one of the passages 82, 83 or 84 so that pressure fluid can be forced into the chambers for loosening the inner races from the neck as will be shown hereinafter.

*Operation*

The bearing mounting 21 (Fig. 1) is installed on the roll mill neck 10 by first assembling the backing ring 48 into position thereon. The assembled bearing housing 40 including the bearing members is now moved onto the neck 10. Pressure ring 62 is loosely located in its position by clamping block 66. A suitably designed hydraulic jack, or other suitable pressure means, is assembled between pressure block 62 and thrust ring 18 and applies sufficient pressure to seat inner races 24, 30 and 34 tight against backing ring 48 and on tapered mill roll neck 10. The pressure is then released on the hydraulic jack, and the thrust ring 18 is removed from the groove 16 permitting the thrust ring 20 and the threaded sleeve member 64 to be installed on the portion 14 of the neck 10. The thrust ring 18 is then reinstalled in the groove 16, and the threaded member 64 is rotated on thrust ring 20 until parts 62, 64, 20 and 18 are jammed tight. Member 64 is then either advanced further or slightly backed off so that locking screw 65 can be assembled in position as previously explained.

The mounting 21 shown in Fig. 1 and described above is particularly suitable for heavy-load high-speed rolling operations. When heavy loads and high speeds are combined, there is a tendency for the roll neck 10 to scuff on the cone bore of the inner races. However, when an interference fit is used between the cone bore and the neck 10 the chances of scuffing are completely eliminated.

The removal or disassembly procedure for separating the mounting 21 from the neck 10 (Fig. 1) is accomplished in four principal steps. First, the sleeve member 64 is backed away from the spacer member 62 and the thrust ring 18 and assembled members 20 and 64 are removed from the neck so that the inner races will be able to move to the left (Fig. 1) when loosed from the neck. Secondly, pressure fluid is fed into the passages 84 and 81 and into the groove 78. Because of the taper of the neck 10 and of the inner race 34 which surrounds the groove 78, the pressure fluid has a force component in the axial direction which forces the race 34 to break loose from the neck 10 by moving to the left. Thirdly, pressure fluid is fed into the groove 76 which similarly breaks loose the race 30 from the neck 10; and fourthly, pressure fluid is fed into the groove 74 to loose the race 24 from the neck 10.

Each time one of the races breaks or pops loose from the neck 10, it jumps to the left (Fig. 1) either striking the spacer 62 or the next adjacent race to the left. When the middle or double inner race 30 breaks loose, it carries the chuck or housing 40 with it to the left. Heretofore, the sudden breaking loose and endwise movement of the housing 40 resulted in damage to the bearing members. However, in a mounting constructed according to the present invention, in which the flange 60 is provided, the bearing members are protected. When the housing 40 breaks loose with the race 30, the leftward movement of the housing 40 causes the flange 60 to strike the adjacent end of the inner race 24 instead of striking the cage on the rollers 22.

In Fig. 1, when members 18, 20 and 64 are removed from the neck, member 62 is stopped by clamping block 66 when the race 34 is loosened on the neck. When inner race 30 is loosened on the neck, flange 60 in housing 40 is stopped by inner race 24 which is still tight on the neck; and when inner race 24 is loosened on the neck the entire bearing housing assembly can be removed from the neck.

In the modified bearing assembly 96 shown in Fig. 2, the backing ring and the adjacent inner race are formed integrally as member 90. This construction permits a reduction of the distance from the innermost row of bearing rollers 22 to the end face 25 of the mill roll body 12 and also reduces the length of the neck 10. By so providing it is possible to have a stronger shorter neck without any loss in the operational characteristics thereof.

Another principal difference between modified bearing mounting of Fig. 2 and that discussed in connection with Fig. 1, is in the construction of sleeve member 92 (Fig. 2) and clamping block 94. Instead of using a flange on the inboard side of the bearing members, such as flange 60 in Fig. 1, the breaking shock that occurs when the inner race 30 is separated from the neck 10 in the modified bearing mounting 96 is taken by radially adjustable stop blocks 98 positioned at the outer end of the clamping block 94 on the outboard side thereof from the housing 40. The sliding blocks 98 are fastened to the outer end of the clamping block 94 by means of screws or bolts 100 that extend through elongated slots 102 therein. When removing the bearing mounting 96 from the neck 10, the sleeve member 92 is backed off on the threaded member 20 until the space between the member 92 and block 94 is sufficient for the adjustable stop blocks 98 to slide down with at least a clearance of 1/16 of an inch. The thrust ring 18 is left assembled during loosening of the bearing members, and the stop blocks 98 are held in their new position with bolts 100.

Pressure fluid is then applied into the axial passages 84, 83 and 82 as described above by means of suitable fittings in the open ends thereof and into the respective grooves associated therewith. When pressure fluid is applied into the passages 84 and 81 and into the groove 78 an axial force is exerted between the neck 10 and the inner race 34 which forces the members to separate from each other. Next pressure fluid is fed into the groove 76 through passages 83 and 80 to break loose the race 30. With the breaking loose of the race 30, the housing 40 moves to the left moving the outer races 36 and 38 therewith. The inner end of the housing 40 is provided with an annular groove 106 which is large enough to permit the housing 40 to clear the rollers 22 for a considerable distance so that the interposed stop blocks 98 strike the outwardly extending portion 104 of the sleeve member 92 to stop the leftward movement of the housing 40.

The unitary construction of the backing ring and the inner race, the use of the stop blocks 98, and the enlarged portion 104 of the sleeve member 92 are the principal difference in construction between the modified bearing mounting 96 and the bearing mounting 21 shown in Fig. 1. The operation of the modified mounting 96 otherwise is similar to that of the mounting 21.

The further modification shown in Fig. 3 incorporates most of the features of the modification of Fig. 2. The principal difference between the modifications of Figs. 2 and 3 is in the innermost seal arrangement between the bearing housing 40 and the neck 10 or mill roll body 12. Innermost seal 108 in Fig. 2 is similar to the seal 52 in Fig. 1, both being attached to the housing 40 and both making sliding engagement with a cylindrical surface. In Fig. 1 the cylindrical surface is on the backing ring 48 while in Fig. 2 the corresponding surface is on the member 90. In the Fig. 3 modification, a seal 120 is positioned in an axially disposed groove 121 in the housing 40 and instead of making engagement on a cylindrical surface, it engages the end face 25 of the mill roll body 12. There are several advantages derived from the use of seal 120 of Fig. 3; principal among these are a still further reduction in the overall length of the neck 10 which further increases the strength thereof, and simplified installation of the bearing mounting 122 on the neck 10 because the seal 120 does not have to be fitted onto a cylindrical surface. Fitting an annular seal to a cylindrical surface usually requires considerable care, and if the parts are not properly aligned damage may result to the seal. A still further advantage of using the seal 120 is obtained by being able to clean and replace the seal 120 more readily. This is true because the sealing surfaces are exposed for cleaning and the seal can more easily be slid out of an axial positioning groove for replacing.

It is now apparent that there has been provided a novel bearing mounting for a tapered mill roll neck or the like, which fulfills all of the objectives and advantages sought therefor.

The foregoing description and the accompanying drawings have been presented only by way of illustration and example, and changes and alterations in the present disclosure, which will be readily apparent to one skilled in the art, are contemplated as within the scope of the present invention which is limited only by the claims which follow.

What I claim is:

1. A bearing mounting for tapered journals comprising a tapered journal member, a bearing housing having bearing members positioned therein, said bearing members having a tapered opening therethrough for mounting on said tapered journal member, means for applying pressure fluid between the tapered journal member and the tapered opening in the bearing members to free the bearing members from the journal member, and axially spaced means on the journal member and on the bearing housing adapted to cooperate and limit displacement of the bearing housing relative to the journal member when said bearing members are free.

2. A bearing mounting for tapered journals comprising a tapered journal member, a bearing housing, bearing members positioned in said housing and mounted on said tapered journal member, chamber means formed between the tapered journal member and the bearing members including passage means, said passage means having means associated therewith which are adapted to be connected to a source of pressure fluid for introducing said pressure fluid into said chamber means to separate the bearing members from the tapered journal member, and axially spaced means on the bearing housing and on the journal member which move into cooperative engagement during separation of the bearing members from the journal member for limiting relative movement between the journal members and the housing.

3. The bearing assembly for tapered journals as defined in claim 2 in which the portion of the axial spaced means on the housing include an inwardly extending flange and the portion of the axial spaced means on the journal member include an abutment on the journal member in spaced axial alignment with said flange.

4. The bearing assembly for tapered journals as defined in claim 2 in which the axial spaced means include an inwardly extending member carried on the bearing housing in opposed axial alignment with an outwardly extending thrust ring carried on the journal member.

5. The bearing assembly for tapered journals as defined in claim 3 in which the axial spaced means are positioned adjacent to the bearing members on the side thereof associated with the larger diameter portion of the tapered journal member.

6. The bearing assembly for tapered journals as defined in claim 4 in which the axial spaced means are positioned adjacent to the bearing members on the side thereof associated with the smaller diameter portion of the tapered journal member.

7. A bearing mounting for tapered rotary members comprising a tapered rotary member; a bearing housing; bearing members positioned in the bearing housing and capable of movement relative thereto, said bearing members having a tapered opening therethrough which is interference fitted on the tapered rotary member, chamber means formed between the bearing members and the tapered rotary member and adjacent to the interference fit, said chamber means including connecting passage means in the rotary member adapted to be connected to a source of pressure fluid for introducing said pressure fluid into the chamber means for breaking the interference fit and forcing one of the bearing members to move relative to the bearing housing, and axially spaced cooperating members carried on the bearing housing and on the tapered rotary member for coacting with each other and to limit relative axial movement therebetween when the interference fit is broken.

8. A bearing assembly for a tapered journal comprising a tapered journal member, a bearing housing, anti-friction bearing members positioned in said housing and capable of endwise movement relative thereto, said bearing members including at least one inner race member having a tapered bore extending therethrough which is interference fitted on said tapered journal member, chamber means formed between the tapered journal member and said inner race member adjacent to the interference fit therebetween, said chamber means including passage means in the journal member which are adapted to be connected to a supply of pressure fluid which is introduced into the chamber means for breaking the interference fit between the inner race member and the journal member, a flange on said bearing housing and a cooperating abutment on the journal member positioned in spaced axial relation to limit relative movement therebetween when the inner race is loosened from said journal member, and a seal positioned between said bearing housing and said journal for sealing therebetween.

9. A bearing assembly for a tapered mill roll neck comprising a bearing housing, anti-friction bearing members positoned in said housing at least one member thereof being capable of endwise movement relative to the housing, said bearing members including at least two inner race members having a tapered bore extending therethrough, a mill roll having an endwise extending tapered neck, said neck being interference fitted to the inner race members in the tapered bore, chamber means formed between the tapered neck and at least one of said inner race members, said chamber means including connecting passage means adapted to be connected to a supply of pressure fluid which is introduced therein to loosen the associated inner race member and the bearing housing from the neck by breaking the interference fit between the inner race and the neck, a flange on said bearing housing and an abutment surface on said neck, said flange and abutment surface being in axial spaced alignment to cooperate with each other and limit relative axial movement between said housing and said neck when the interference fit is broken, and means on said bearing housing for slidably sealing between the bearing housing and the neck.

10. The bearing assembly for a tapered mill roll neck as defined in claim 9 in which one of said inner race members is formed integral with a backing ring.

11. A bearing assembly for tapered journal members comprising a tapered inner race including a backing ring portion, said inner race being force fitted on a tapered journal member, an outer race, anti-friction members positioned between said inner and outer races, chamber means formed between said inner race and the journal member including passage means thereinto for injecting pressure fluid in said chamber to loosen said inner race on the journal member, and axially spaced abutments on said journal member and said outer race for restricting relative movement between said members when said inner race is loosened from said journal member.

12. A bearing assembly for a tapered mill roll neck comprising a bearing housing, an anti-friction bearing assembly positioned in said housing at least one member thereof being capable of endwise movement relative to the housing, said bearing assembly including at least two inner race members having a tapered bore therethrough, a mill roll having an endwise extending neck with a tapered outer surface, said neck being pressure fitted to the iner race members in the tapered bore, chamber means formed in the outer surface of the tapered neck between the neck and at least one of said inner race members, said chamber means including passage means adapted to be connected to a supply of pressure fluid which is introduced therein to loosen the associated inner race member and the bearing housing from the neck by breaking the pressure fit between said inner race and the neck, a flange on said bearing housing and an abutment surface on said neck, said flange and abutment surface being in axial spaced alignment to cooperatively engage each other and limit relative axial movement between said housing and said neck when the pressure fit is broken, and means on said bearing housing providing a sliding seal between the bearing housing and the mill roll.

13. The bearing assembly for a tapered mill roll neck as defined in claim 12 in which one of said inner race members includes an integral backing ring portion which extends to adjacent said mill roll.

14. A bearing assembly for a tapered mill roll neck comprising a bearing housing, a bearing assembly positioned in said housing and including at least one member thereof capable of endwise movement relative to the housing, said bearing assembly also including at least two inner race members having a tapered bore extending therethrough, a mill roll having an endwise extending tapered neck interference fitted in the tapered bore to the inner race members, first chamber means formed between the tapered neck and one of said inner race members, second chamber means formed between the tapered neck and the other inner race member, each of said chamber means including connecting passage means adapted to be connected to a supply of pressure fluid which is introduced therein to loosen the associated inner race members from the neck by breaking the interference fit therebetween, a pair of spaced abutment members positioned adjacent each end of said bearing assembly, one of each of said pairs of abutment members being connected to the neck and the other member of each of said pairs of abutment members being connected to the housing, the abutment members in each of said pairs being in axial spaced alignment, one pair of said pairs of abutment members limiting relative axial movement of the associated inner race member when said inner race member is loosened from the neck, and said other pair of abutment members limiting relative axial movement between said housing and said neck when the associated inner race is loosened from said neck.

15. In a bearing assembly including a tapered journal, a cooperating housing, a bearing having a tapered opening to receive said tapered journal and sized to fit within said housing, a pressure fluid passage in said journal opening in a channel in the tapered portion of said journal received in the tapered opening of said bearing, and stop means carried between said journal and housing adjacent said bearing, said stop means normally providing a space for permitting movement of one of said housing and bearing relative to said journal upon pressure fluid supply to said passage and channel in disassembly of the bearing assembly.

References Cited in the file of this patent
UNITED STATES PATENTS
2,840,399    Harless et al. _____ July 26, 1952